United States Patent
Cupp, Sr. et al.

(10) Patent No.: US 9,586,679 B2
(45) Date of Patent: Mar. 7, 2017

(54) AUTOMATIC PITCH CHANGE ROTARY WING ROTOR SYSTEM AND METHOD OF ROTOR CONTROL

(71) Applicant: Karen Cupp, Corona, CA (US)

(72) Inventors: John Neal Cupp, Sr., Corona, CA (US); John Neal Cupp, Jr., Huntington Beach, CA (US)

( * ) Notice: Subject to any disclaimer, the term of this patent is extended or adjusted under 35 U.S.C. 154(b) by 0 days.

(21) Appl. No.: 14/818,105

(22) Filed: Aug. 4, 2015

(65) Prior Publication Data

US 2015/0375858 A1    Dec. 31, 2015

(51) Int. Cl.
| | |
|---|---|
| *B64C 11/00* | (2006.01) |
| *B64C 27/02* | (2006.01) |
| *B64C 27/54* | (2006.01) |
| *A63H 27/00* | (2006.01) |
| *B64C 27/52* | (2006.01) |

(52) U.S. Cl.
CPC ........... *B64C 27/025* (2013.01); *A63H 27/12* (2013.01); *B64C 27/52* (2013.01); *B64C 27/54* (2013.01)

(58) Field of Classification Search
None
See application file for complete search history.

(56) References Cited

U.S. PATENT DOCUMENTS

| | | | | |
|---|---|---|---|---|
| 1,789,240 A | * | 1/1931 | Leitner ................. | B64C 11/343 416/135 |
| 1,942,888 A | * | 1/1934 | West ....................... | B64C 27/12 416/130 |
| 1,946,614 A | * | 2/1934 | Darr ........................ | B64C 27/54 416/115 |
| 2,012,989 A | * | 9/1935 | Chillingworth ......... | B64C 27/12 416/127 |
| 2,105,682 A | * | 1/1938 | Bennett ................. | B64C 27/021 416/148 |
| 2,464,285 A | * | 3/1949 | Andrews ................. | B64C 27/46 244/6 |
| 2,631,679 A | * | 3/1953 | Hiller, Jr. ................ | B64C 27/43 416/102 |
| 2,657,882 A | * | 11/1953 | Perry ..................... | B64C 3/385 244/48 |

(Continued)

FOREIGN PATENT DOCUMENTS

FR    1186969 A    9/1959

OTHER PUBLICATIONS

International Search Report and Written Opinion for International Application No. PCT/US2014/019143; Jun. 17, 2014; 8 pages.

(Continued)

*Primary Examiner* — Medhat Badawi
(74) *Attorney, Agent, or Firm* — Klein, O'Neill, Singh, LLP (57) ABSTRACT

A helicopter main rotor control system includes a trunnion head mountable to a rotatable helicopter mast wherein the trunnion head has a control bar pivot supported by the trunnion head and pivotal about an axis substantially at a right angle to the helicopter mast. A control bar extends through the control bar pivot at a right angle thereto, and a pair of opposing leaf hinges are pivotal about the control bar and centered about said trunnion head. Each leaf hinge has a hinge plate extending from the control bar and defines a rotor blade mount hole therethrough.

21 Claims, 7 Drawing Sheets

(56) References Cited

U.S. PATENT DOCUMENTS

| | | | | |
|---|---|---|---|---|
| 2,684,695 | A * | 7/1954 | Howell | B27B 5/10 144/34.1 |
| 2,684,722 | A * | 7/1954 | Perry | B64C 27/43 416/148 |
| 2,735,500 | A | 2/1956 | Perry | |
| 2,827,968 | A * | 3/1958 | Sissingh | B64C 27/54 416/18 |
| 2,863,514 | A * | 12/1958 | Payne | B64C 27/32 416/103 |
| 3,204,700 | A | 9/1965 | Milligan | |
| 3,391,746 | A * | 7/1968 | Cardoso | B64C 27/54 416/128 |
| 3,771,923 | A * | 11/1973 | DeMontaigu | B64C 37/00 244/17.11 |
| 4,092,084 | A * | 5/1978 | Barltrop | B64C 27/43 416/102 |
| 5,165,854 | A * | 11/1992 | Cicare | B64C 27/605 244/17.25 |
| 5,628,620 | A * | 5/1997 | Arlton | A63H 27/12 416/103 |
| 5,853,145 | A * | 12/1998 | Carter, Jr. | B64C 27/32 244/17.25 |
| 6,152,696 | A * | 11/2000 | Rampal | B64C 27/605 416/114 |
| 6,439,849 | B1 * | 8/2002 | Sehgal | B64C 27/35 416/134 A |
| 6,695,254 | B2 * | 2/2004 | Zoppitelli | B64C 27/35 244/17.11 |
| 2005/0067527 | A1 * | 3/2005 | Petersen | B64C 27/10 244/17.11 |
| 2012/0230824 | A1 * | 9/2012 | Muren | A63H 27/12 416/148 |
| 2014/0263821 | A1 * | 9/2014 | Cupp, Sr. | B64C 27/54 244/17.13 |
| 2014/0377068 | A1 * | 12/2014 | Arnold | B64C 27/605 416/134 A |

OTHER PUBLICATIONS

Extended European Search Report from European Patent Office on related EP application (EP14768965.7) dated Dec. 7, 2016.

* cited by examiner

AUTOMATIC PITCH CHANGE ROTARY WING ROTOR SYSTEM AND METHOD OF ROTOR CONTROL

COPYRIGHT NOTICE

Portions of the disclosure of this patent document may contain material that is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

CROSS-REFERENCE TO RELATED APPLICATIONS

The present application is a continuation patent application of U.S. patent application Ser. No. 13/836,190 filed on Mar. 15, 2013, the entire contents of which are incorporated herein by reference.

BACKGROUND OF THE INVENTION

Field of the Invention

The present invention relates to helicopter control systems and more particularly to an automatic pitch change mechanism for rotary wing aircraft with a simplified control system.

Discussion of the Related Art

A helicopter is a flight vehicle that derives its lift and thrust from one or more rotating sets of airfoils called rotors. In a most common configuration, a helicopter will have a single main rotor having two or more blades rotating primarily in a horizontal plane about a vertical shaft above the fuselage of the vehicle. The rotating main rotor causes a counter rotational force on the fuselage which must be counteracted to maintain the fuselage in a stable position. Most helicopters also have a smaller tail rotor at the rear of the fuselage to counter the rotational forces placed on the fuselage by the main rotor, other helicopters utilize fans or ducted airflow at the tail of the helicopter to provide the necessary forces to counter this rotational force.

The helicopter main rotor is powered by the engine, through a transmission to a rotating mast. The mast is a cylindrical metal shaft extending upward from the transmission. At the top of the mast is mounted a hub to which two or more rotor blades are attached. Main rotor systems are classified according to how the main rotor blades are attached and move relative to the main rotor hub. Main rotor systems fail into one of three basic configurations: rigid, semi-rigid, or articulated although some rotor systems use an engineered combination of these classifications.

Maneuvering of the helicopter is primarily accomplished through pilot inputs to the main rotor through the use of collective and cyclic controls which impart adjustments to the main rotor to provide the desired directional movements of the helicopter. Foot pedals operable by the pilot allow for yaw control of the fuselage about the axis of the mast.

An articulated rotor system in one where each rotor blade is attached to the rotor hub through a series of hinges allowing the blade to move independently of the others. These rotor systems usually have three or more blades. The blades are allowed to flap, feather, and lead or lag independently of each other. A horizontal hinge, called the flapping hinge allows the blade to move up and down. This movement is called flapping and is designed to compensate for dissymmetry of lift. The flapping hinge may be located at varying distances from the rotor hub, and there my be more than one hinge. The vertical hinge, called the lead-lag or drag hinge, allows the blade to move back and forth. This lead-lag or dragging movement compensates for the acceleration and deceleration caused by momentum conservation. Excessive back and for the movement around the drag hinge is usually prevented through use of dampers.

A semi-rigid rotor is normally composed of two blades which meet just under a common flapping or teetering hinge at the rotor shaft. This allows the blades to flap together in opposite motions like a seesaw. This underslinging of the blades below the teetering hinge, combined with an adequate dihedral or coning angle on the blades, minimizes variations in the radius of each blade's center of mass from the axis of rotation as the rotor turns, which in turn reduces the stress on the blades from lead and lag forces. Secondary flapping hinges may also be provided to permit sufficient flexibility to minimize bouncing.

Articulated and semi-rigid systems also typically include a feathering hinge to permit changes to the pitch angle of the blade. The pitch angles of the blades can be changed uniformly with a single control input from the collective control. The pitch angles of the blades can also be changed according to the position of the blade in the cycle of the rotor disk, increasing and decreasing as the blade rotates about the mast. Collective and cyclic pitch changes to the rotor blades are accomplished by adjusting the orientation of a swash plate interconnected to the individual rotors.

The swashplate in the helicopter control stream has a pair of plates, one rotating and one fixed, that are centered on the main rotor shaft. The rotating plate is linked to the rotor head, and the fixed plate is linked to the operator cycle and collective controls. Angular displacement of the alignment of the fixed plate is transferred to the rotating plate, where it becomes reciprocal motion of the rotor blade linkages. This type of pitch control, known as cyclic pitch, allows the helicopter rotor to provide selective lift in any direction. Axial displacement of the swash plate along the axis of the mast translates into a uniform movement of the rotor blade linkages about the rotor hub. This type of pitch control, is known at collective pitch, allows the helicopter rotor to provide uniform lift along the mast axis.

A rigid rotor system usually refers to a hingeless rotor system with blades that are flexibly attached to the hub. In a rigid rotor system, each blade flaps and drags about flexible sections of the blade root. A rigid rotor system is mechanically simpler than a fully articulated rotor system. Loads from flapping and lead/lag forces are accommodated through rotor blade flexure, rather than through hinges. By flexing, the blades themselves compensate for the forces which previously required rugged hinges. This results in a rotor system that has less lag in the control response because the rotor has much less oscillation. The rigid rotor system also negates the danger of mast bumping inherent in teetering rotors found in semi-rigid systems.

Two bladed rotor systems can also include a stabilizer bar or flybar oriented perpendicular to the axes of the two diametrically opposed rotor blades. The stabilizer bar has a weight or paddle at either end which cause the bar to stay relatively stable in the plane of rotation and reduces crosswind thrust on the rotors. Through mechanical linkages, the stable rotation of the bar is mixed with the swashplate movement so that internal as well as external forces on the rotor are damped. This eases the workload of the pilot to maintain control of the helicopter.

Previous and existing helicopter rotor systems depend on mechanically complex mechanisms to control each rotor blade for its proper lift vector. Blade pitch is varied as it rotates into and away from the relative air velocity vector while in forward flight through use of cyclic pitch controls. These controls make fully articulated rotor systems difficult to control and especially as a remotely piloted vehicle. The mechanical complexity also contributes to considerably expensive design, construction, and maintenance.

Thus what is desired is an articulated helicopter rotor system that is mechanically simple and easy to control.

SUMMARY OF THE INVENTION

The present invention is directed to a helicopter main rotor control system that satisfies the need for a mechanically simple and easily controlled articulated rotor control. The rotor control system comprises a trunnion head mountable to a rotatable helicopter mast wherein the trunnion head has a control bar pivot supported by the trunnion head and pivotal about an axis substantially at a right angle to the helicopter mast. A control bar extends through the control bar pivot at a right angle thereto, and a pair of opposing leaf hinges are pivotal about the control bar and centered about said trunnion head. Each leaf hinge has a hinge plate extending from the control bar and defines a rotor blade mount hole therethrough.

In another aspect the present invention includes a rotor blade affixed to each hinge plate at the rotor blade mount hole and is pivotal thereabout.

In yet another aspect the present invention, the rotor blades are pivotal through an arc of zero degrees to ninety degrees with respect to the control bar.

In a further aspect the invention, the rotor blades are pivotal through an arc of fifteen to forty-five degrees with respect to the control bar.

In a still further aspect of the invention, the rotor blades are pivotal through an arc of twenty five to thirty degrees with respect to the control bar.

In another aspect of the invention, each rotor blade includes a high lift airfoil cross-section.

In still another aspect of the invention, a pitch angle of attack of each rotor blade is fixed and non-rotatable with respect to a plane of the leaf hinge when the rotor is affixed at a ninety degree angle with respect to the control bar.

In a further aspect of the invention, each rotor blade is mounted a fixed distance above the hinge plate.

In yet a further aspect of the invention, each rotor blade mounting includes a hydraulic apparatus for adjusting a distance each rotor blade is above the hinge plate.

In still yet a further aspect of the invention, each rotor blade mounting includes a ball screw apparatus for adjusting a distance each rotor blade is above the hinge plate.

In another aspect of the invention, the control bar terminates at two distal ends thereof and further includes a weight affixed at each end of the control bar.

In yet a further aspect of the invention, a helicopter rotor control system comprises a trunnion head mountable to a rotatable helicopter mast wherein the trunnion head has a control bar pivot supported by the trunnion head and pivotal about an axis substantially at a right angle to the helicopter mast. A control bar extends through the control bar pivot at a right angle thereto, and a pair of opposing leaf hinges are pivotal about the control bar and centered about said trunnion head. Each leaf hinge has a hinge plate extending from the control bar and defines a rotor blade mount hole therethrough. A rotor tilting mechanism changes the rotational plane of the rotor for directional control.

In still a further aspect of the invention, the rotor tilting mechanism for directional control comprises a swash plate including control rods running to a yoke encircling said trunnion head and said mast.

In a further aspect of the invention, the rotor tilting mechanism for directional control comprises a mast tilting mechanism.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF THE PREFERRED EMBODIMENT

Figure 1:
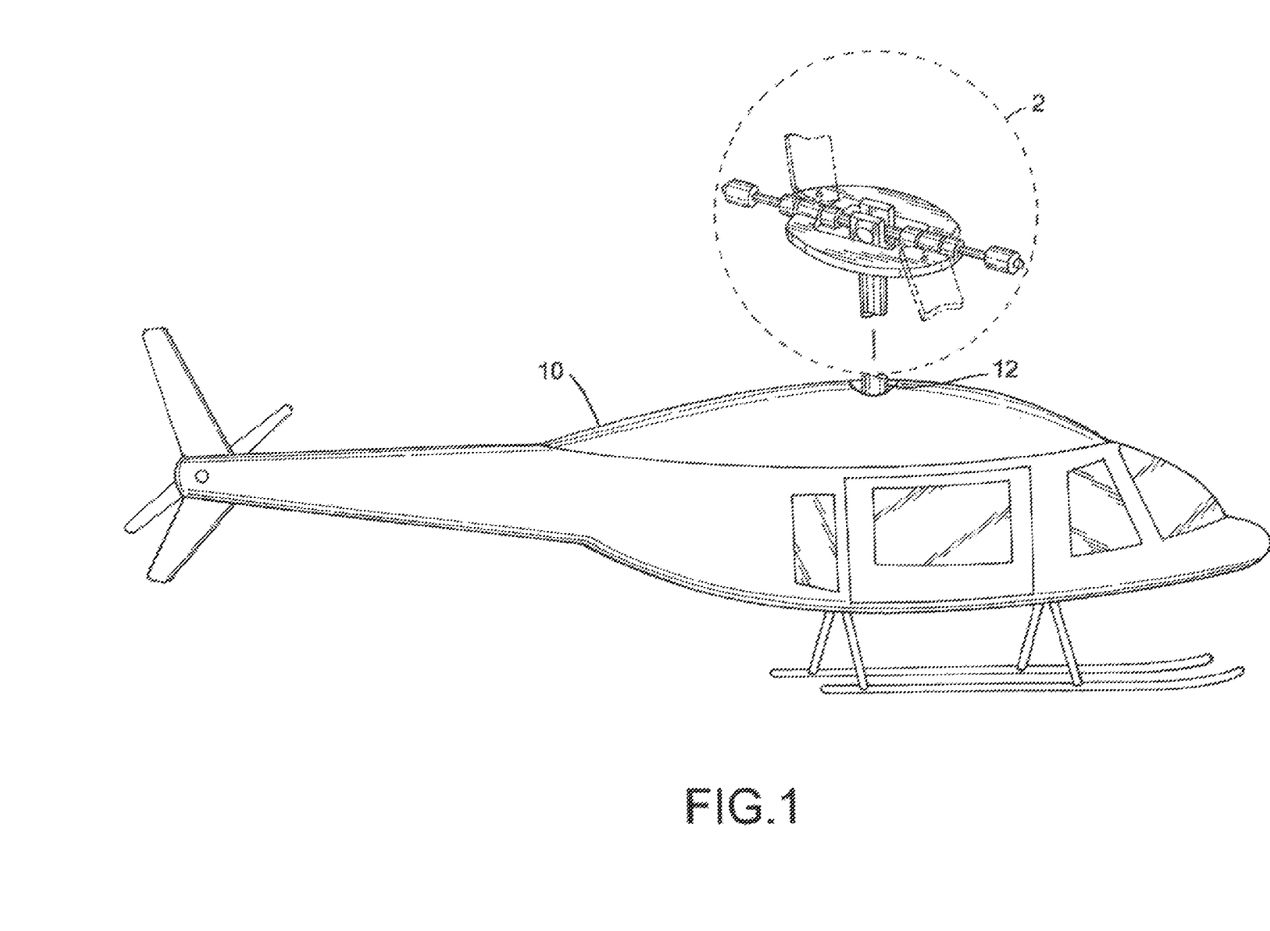
FIG. 1 is a perspective view of helicopter having a main rotor system embodying the present invention.

For purposes of description herein, the terms "upper", "lower", "left", "rear", "right", "front", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 shows a helicopter 10 with a vertically extending mast 12 above the helicopter on which is mounted a rotor system 20 which is one of the preferred embodiments of the present invention and illustrates its various components.

Turning now to FIGS. 2-6, the rotor system 20 and its various components are illustrated wherein a trunnion head 60 is mounted to the top of mast 12, and a stabilizer or control bar 22 is pivotally retained by the trunnion head 60. A weight 28 is affixed at each end of control bar 22. Intermeshing leaf hinges 40 are pivotally mounted to control bar 22 and centered on trunnion head 60. A rotor 14 is mounted to an upper surface of hinge plate 42 of each leaf hinge 40.

Figure 6:
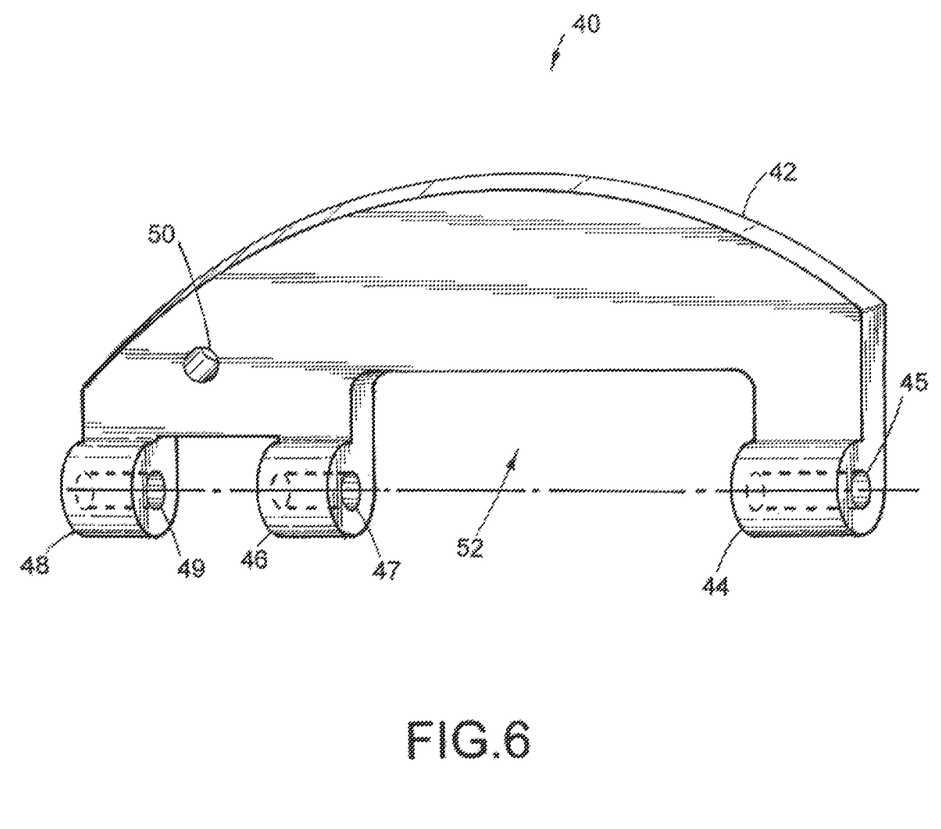
FIG. 6 is a perspective view of the hinge leaf for mounting a rotor blade to the rotor system.

Leaf hinge 40 is most fully illustrated in FIG. 6 where leaf hinge 40 comprises a hinge plate 42 having a curved edge on one side and on an opposite side a plurality of hinge fangs, 44, 46, 48. Hinge tangs 44, 48, 48 have co-axial holes 45, 47, 49 for receiving the control bar 22. Hinge tangs 46 and 48 are spaced one from the other a distance to closely receive a hinge fang 44 of a like but oppositely oriented leaf hinge 40. Hinge plate 42, and hinge tangs 44 and 48 define a pivot gap 52 of sufficient size to unobstructedly surround trunnion head 60. Hinge plate 42 further defines a blade mount hole 50 therethrough which is oriented at a right angle to the plane of hinge plate 42.

Figure 3:
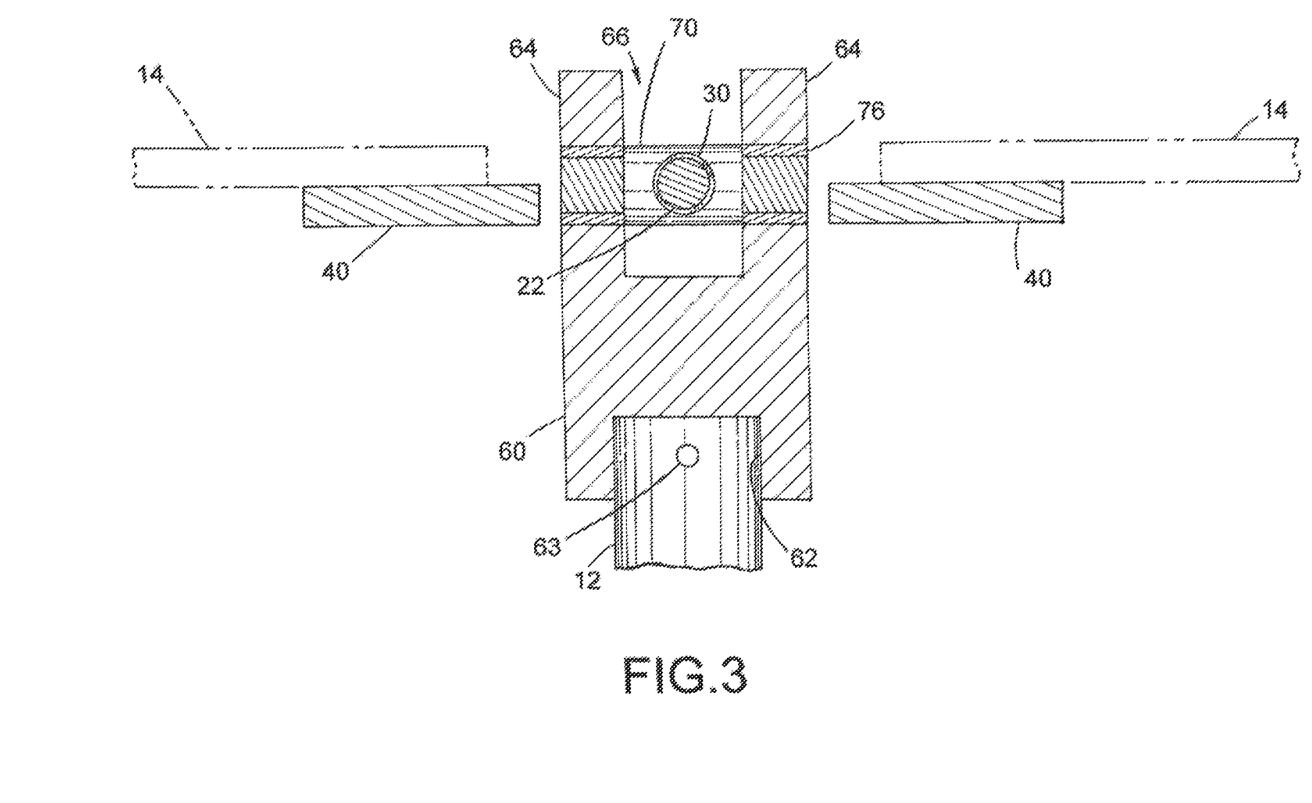
FIG. 3 is a cross-sectional view of the main rotor hub shown in FIG. 2 and taken along the line 3-3 of FIG. 2.
Figure 4:
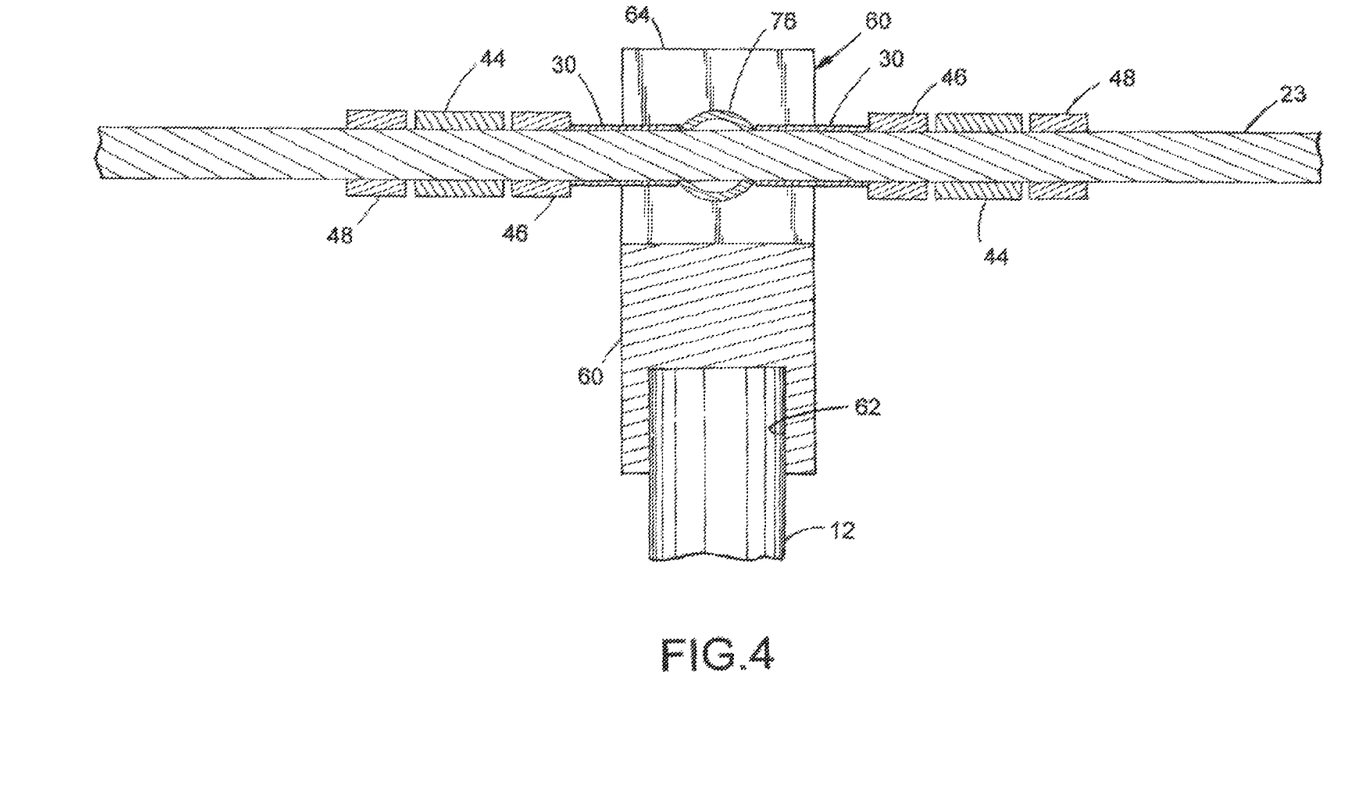
FIG. 4 is a cross-sectional view of the main rotor hub shown in FIG. 2 and taken along the line 4-4 of FIG. 2.
Figure 5:
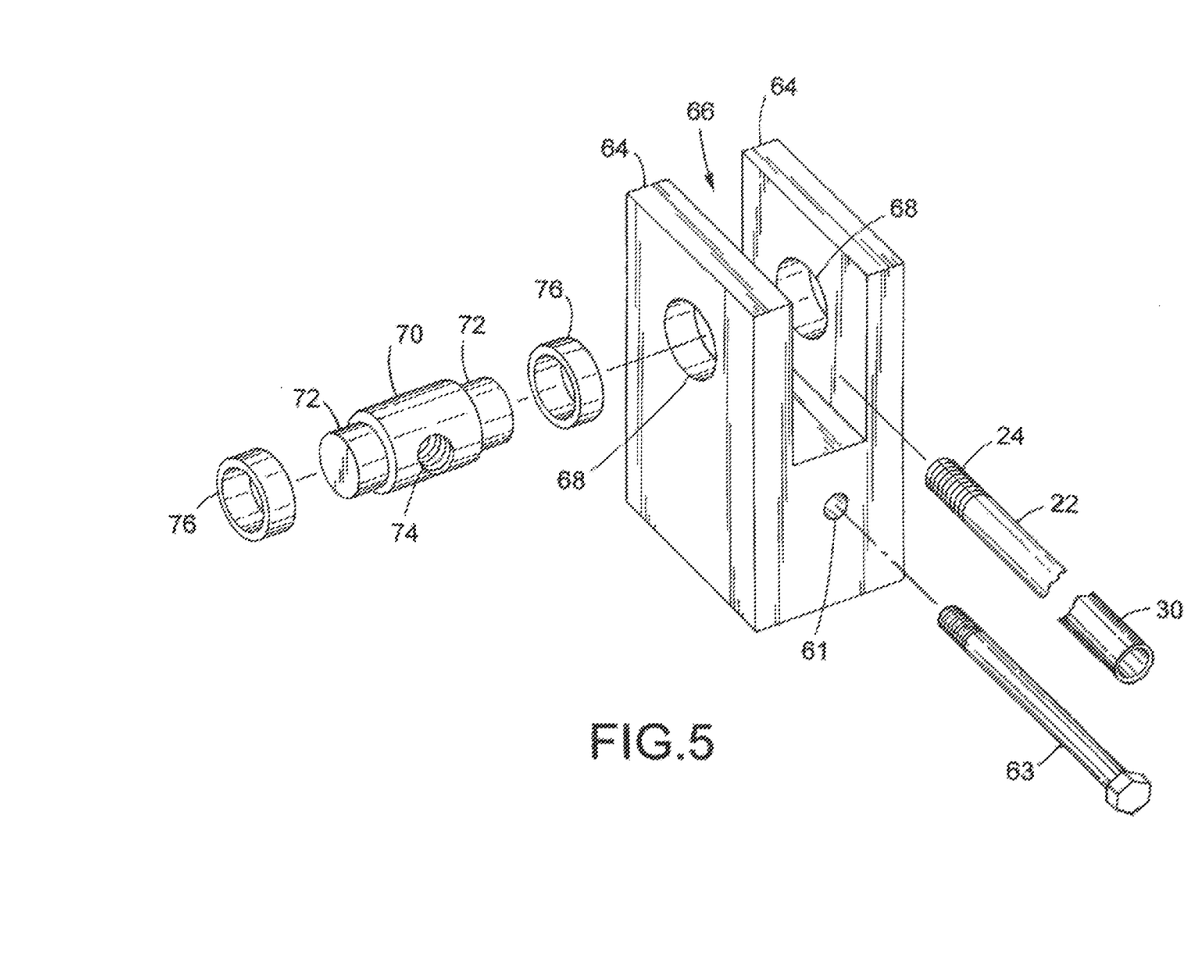
FIG. 5 is a perspective view of the pivot and trunnion attaching the rotor system to the helicopter mast.

Referring now to FIGS. 3-5, trunnion head 60 is mounted to a top of mast 12 wherein the top of mast 12 is received in mast receptacle 62. Mast receptacle 62 can be infernally threaded to match and engage with like male threads at the top of mast 12, or can be configured with other known mating configurations to secure trunnion head 60 to the top of mast 12. Trunnion head 60 is further secured to mast 12 with a look pin such as bolt 63 extending through aperture 61 in trunnion head 60 and a like aperture in mast 12. An upper portion of trunnion head 60 includes two laterally separated control rod support legs 64 defining coaxially aligned pivot support apertures 68. Laterally separated control rod support legs 64 further define therebetween a channel 66.

A control bar pivot 70 is received in pivot support apertures 68 and extends between control rod support legs 64. Control bar pivot 70 has at each end thereof a shoulder relief 72 such that the diameter of shoulder relief 72 is smaller than the diameter of pivot support apertures 68. A bushing 76 is closely received in each pivot support aperture 68 and is sleeved over shoulder relief 72 of control bar pivot 70. While control bar pivot 70 is typically fabricated of a high strength material such as steel bushings 76 are fabricated from a softer metal such as brass to facilitate the pivoting of control bar pivot 70 in bushings 76 and with respect to trunnion head 60. Control bar pivot 70 also defines a control bar hole 74 extending through a center thereof and oriented at a right angle to the axis of control bar pivot 70 and pivot support apertures 68.

Figure 2:
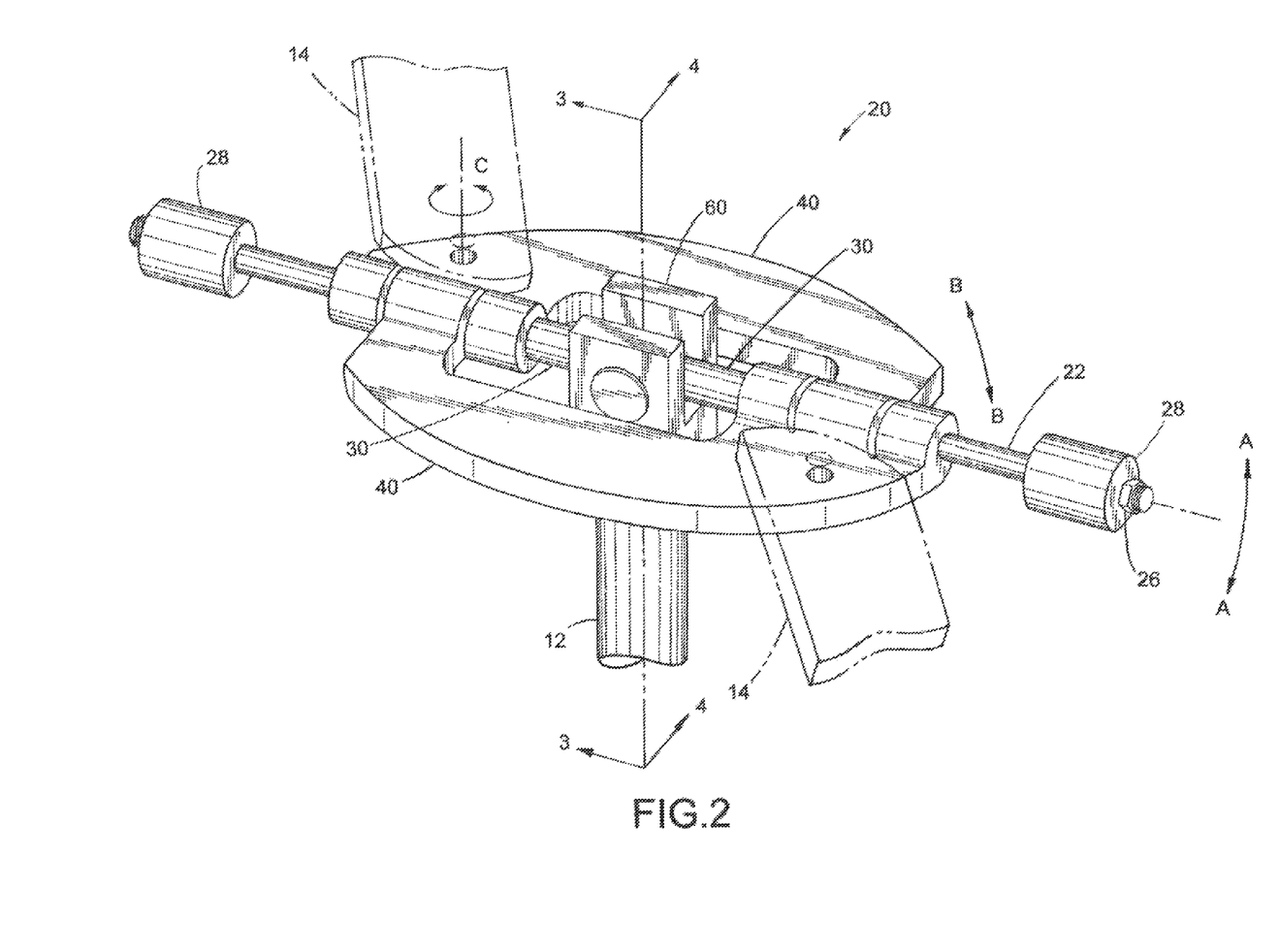
FIG. 2 is a perspective view of a two bladed main rotor system embodying the present invention.

Control fear 22 extends through and is substantially longitudinally centered in control bar hole 74 of control bar pivot 70. Each end of control bar 22 can have male threads 24 formed thereon. As illustrated in FIG. 2, a weight 28 is retained at each end of control bar 22 and is retained thereat with a threaded nut 26. Fine adjustment of the balance of control bar 22 about the axis of control bar pivot 70 is accomplished by adjusting the position of threaded nut 26 on control bar 22 in a manner well known in the industry.

As most clearly illustrated in FIGS. 2 and 4, opposing and intermeshed leaf hinges 40 are mounted on control rod 22. Opposing leaf hinges 40 are arranged such that hinge tang 44 of one leaf hinge 40 is received between hinge tangs 48 and 48 of the opposing leaf hinge 40 end the control bar holes 45, 47, 49 of each leaf hinge 40 are axially aligned and receive therein control bar 22. A control bar spacer 30 is sleeved over control bar 22 on each side of control bar pivot 70 and extends from control bar pivot 70 to respective hinge tangs 46 of opposing leaf hinges 40. In this manner, intermeshed opposing leaf hinges 40 are centered along control bar 22 and with respect to control bar pivot 70 and can pivot about control bar 22. There are two droop stops associated with leaf hinges 40 to limit the droop of the blades while the rotor is stationary and to permit start up of the rotor. Droop stops are well known in the industry and have been omitted for clarity.

A rotor blade 14 is mounted to an upper surface of each leaf hinge 40 at blade mount hole 50. Each rotor blade is constructed with a fixed pitch angle with respect to the plane of hinge plate 42. There are several possibilities for mounting blade 14 above the hinge plate 42. In one embodiment the blades 14 are mounted a fixed distance above the hinge plate 42 corresponding to the rotational velocities to be used. In another embodiment, the distance above the hinge plate 42 can be adjusted in flight using hydraulics, ball screws, or any other suitable method, with a fixed rotational velocity. Alternatively, a combination of both mounting methods can be utilized. Most airfoil sections can be flown with the APC system, the best of which have good lifting capabilities at a low angle of attack and a negative moment. A negative moment tends to pitch the leading edge of the blade down and is counteracted by the rotational and lift forces. The result is that the blade is "squeezed" between the forces and vibrations are further dampened. Additionally, There are two lag stops needed for start up to prevent excessive lag of the blade with respect to the leaf hinge 40. Lag stops are also known in the art and have been omitted for clarity.

Figure 7:
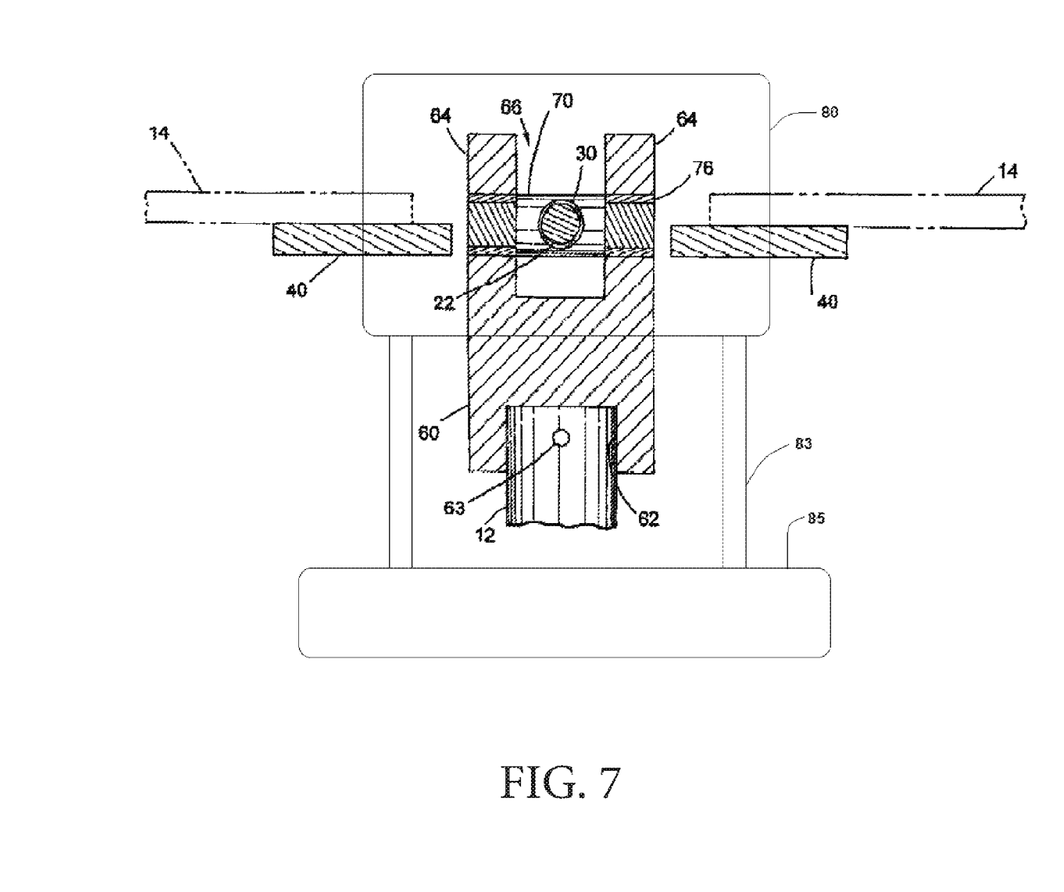
FIG. 7 is a schematic view of the main rotor hub shown with a swashplate setup with control rods running to a yoke encircling the trunnion head.

The rotor system 20 does not require a cyclic pitch control. Directional control can be accomplished by tilting the rotor rotational plane utilizing a tilting mechanism. One such mechanism is a conventional swash plate 85 setup, as shown in FIG. 7, with control rods 83 running to a yoke 80 encircling the trunnion head 60 and mast 12, which is locked to the control bar 22. Alternatively, directional control can be accomplished by tipping the mast 12. The mast tilt feature is possible because of the natural tendency of the rotor to be perpendicular to the axis of rotation, thus the plane of rotation is changed. The reaction rate (the time it takes to change the rotor plane of rotation) can be affected by the rotor mounting geometry and weight of the control bar 22 and weight 28. The rotor blades 14 do not need cycling because they automatically adjust independently, twice per revolution, for relative air flow. A gust that affects the fuselage causes an automatic reaction of the rotor to adjust. When a helicopter encounters a gust, the fuselage is displaced in the direction of the gust, thus tipping the mast toward the gust. This movement of the fuselage in turn tips the rotor, causing gust compensation. The fuselage weight vector brings the mast and rotor back to their original position. With automatic pitch change caused by relative air flow, the blade lift is equal and with the rotor perpendicular to the mast, rotational forces are balanced, therefore, there isn't any feedback or vibration.

Since rotor system 20 does not have a collective pitch system, it is essentially a lift system, a true rotary wing. The pitch angle is pre-selected in the helicopter design phase for the best lift and the least drag according to the airfoil section employed in rotor blades 14 and is optimized for the desired application and expected operational conditions. The angle of attack (pitch angle) and total lift, generated is maintained by rotational velocity. When the rotational velocity is increased, thereby increasing the lift the pitch angle stays the same, as there is a balance between the lift and the rotational force. When a change in relative air occurs, the rotational and lift forces are unbalanced causing the blade hinges to move, changing the pitch to maintain lift. At a given rotational speed, any change in lift caused by changes in relative air results in the blade moving to maintain lift, essentially creating an automatic altitude hold. This automatic action by the rotor system 20 relieves the pilot or autopilot of its most difficult challenge, that of maintaining altitude.

The rotor system 20 is a unique rotary wing system. The pre-selected angle of attack of the airfoils is attained by the rotational forces (lift and centrifugal) and the angle reference is to relative air, not the mast 12. The mounting geometry is such that each airfoil adjusts to conditions independently as in advancing and retreating air velocities, and so is able to maintain more equal lift between both sides of the rotor disc thereby permitting higher potential top speeds.

By eliminating control mechanisms to the rotor, the complexity of the rotor system 20 is greatly reduced thereby resulting in a simpler and lower cost rotor system that is insensitive to wind gust upset loads. Control of the main rotor is accomplished by tipping the mast 12 (stick) and by rotor velocity (throttle). When utilizing the mast tilt feature, the absence of a swash plate and most of the attendant control rods results in an ideal design application for dual rotor and coaxial helicopters. In forward flight, the rotor system 20 affords "flight feel" characteristics quite similar to a fixed wing aircraft, only with the added dimensions of vertical takeoff and landing.

By utilizing leaf hinges 40, a weighted control bar 22, and specific mounting of the rotor blades 14 to the leaf hinges 40, the rotor system 20 offers a two-bladed articulated rotor, use of high lift (cambered) airfoils, automatic pitch control, automatic altitude hold, improved glide and auto rotation characteristics, three separate methods of attitude control, and variable stability.

Constraints on one part of a rotor system have traditionally shown up elsewhere in the system as a problem. The rotor system 20 accomplishes all of the above without any constraints on the system. The rotor system 20 is the only known system that can effectively utilize high lift airfoils. Current helicopter designs cannot use the high lift blade sections due to the fact that the centers of gravity and the mass of their blades must be equal, if not any variances from identical relationships induces instabilities and vibration that in turn place excessive stresses on the blades resulting in catastrophic failure and loss of the aircraft. The rotor system 20 permits varying relationships between the centers of gravity and mass in the blades, enabling the high lift airfoils to be used.

The position of the mounting of blades 14 on hinge plates 42 with respect to the axis of control bar 22 determines the amount of feathering (pitch angle) and flapping (rotation of leaf hinges 40 about control bar 22). Mounting blades 14 with the leading edge parallel to the control bar 22 (0 degrees) results in feathering but no flapping. Mounting blades 14 at a right angle to the control bar 14 (90 degrees) results in flapping but no feathering. Depending on the desired rotor response, mountings of 15 to 45 degrees will fulfill special needs and mountings of 26 to 30 degrees are utilized for standard operation. At 90 degrees the rotor blades 14 act like a fully articulated system (less pitch) and at 0 degrees rotor blades 14 act like a semi-rigid rotor. As shown in FIG. 2, the rotor blades 14 can rotate C degrees about the rotor blade mount hole 50. For example, the rotor blades 14 can be pivotal about the rotor blade mount hole 50 through an arc of zero degrees to ninety degrees, fifteen degrees to forty-five degrees, and twenty five degrees to thirty degrees with respect to said control bar as illustrated by the rotation angle C.

Automatic pitch is accomplished in the following manner. The center of rotation for the rotor blades 14 is in the center of the trunnion head 60. The rotor blades 14 are mounted on top of the hinge plates 42 therefore above the center of rotation. When the rotor blades 14 are rotated about mast 12, the rotational force (centrifugal force) tends to bring the blade tips down in line with the center of rotation. This action causes the leaf hinges 40 to incline down, rotating about control rod 22. This results in an incline of the blades or blade pitch. Lift, which is produced from the rotation and the pitch, fends to push the blades up. This results in a very sensitive balance.

A downdraft reduces lift, which in turn causes the lift to increase until it is again balanced. When the effect of the downdraft has passed, the lift force is greater than the down force of rotation. The result is that the lift pushes the blades 14 back up, reducing pitch and lift back to the original balance.

An updraft has the reverse effect. In an updraft, the lift is increased, overcoming the rotational force, lifting the hinge angle and decreasing the pitch until the two forces are balanced, returning to the original balance when the draft stops. There is no time lag because when relative air changes, the blade pitch is forced to change so that the forces are balanced.

Translational control of rotor system 20 is facilitated by the control bar 22 controlling the plane of rotation of the rotor. When the plane of rotation of the control bar 22 is changed, the leaf hinges 42 follow, changing the pitch of the blades 14 relative to each other. The leaf hinges 42 can move independently of each other, so that when the plane of rotation of the control bar 22 is changed, the blades 14 and hinges 42 tend to lag. The control bar 22 tips the hinges up on one side and down on the other, thereby changing the relative pitch of the blades 14. The reaction rate is controlled by the rate of change in the plane of rotation of the control bar 22.

Control of the control bar 22 is by precession. The bar weights 28 are oscillated as the bar rotates. The rate of precession is determined by the rotational speed, the diameter and rim weight of the weights 28, and by the distance of the weights 28 to the center of rotation. The weights 28 are on opposite sides of the center of rotation, connected by the control bar 22 through the trunnion head 60. The control bar 22 is oscillated, causing the top of one weight 28 to rotate in the direction that the control bar 22 is rotating. This causes the opposite precession on each end of the control bar 22, causing the bar to tilt. The control bar 22 reverses oscillation each half rotation, thus changing the plane of rotation. The oscillation must stop when the desired plane of rotation is established.

There are several methods of controlling the plane of rotation of the control bar 22. The control bar 22, with attached weights 23, is mounted such that it can rotate in the trunnion head 60. A yoke 80 is locked to the control bar 22 and encircles the trunnion head 60 and mast 12. Rods 83 attached to the yoke 80 and to a swash plate 85 below the rotor hub cause oscillation. When the plane of the control bar 22 coincides with the plane of the swash plate, oscillation stops.

Alternatively, the control bar 22, with attached weights 28, is locked to the trunnion head 60. The mast 12 is tipped and the trunnion head 60 forces the control bar 22 to oscillate until the plane of rotation fo the control bar 22 is oriented ninety degrees to the mast 12, at which time oscillation stops.

The control bar 22 controls the plane of rotation and also stabilizes the rotor system 20. This is accomplished without any physical restraints on the rotor blades 14 which is important since the rotor blades 14 must be free to react to the relative air. Forward flight is an example of the reaction of the rotor system 20 wherein the rotor blades 14 adjust automatically twice per revolution for the difference in the advancing and retreating blade-to-air velocities caused by forward flight.

Translational control is achieved by tilting either the mast 12 or the swash plate (not shown) in the desired flight path direction. For example, a ten degree tilt would produce a translational vector equal to about seventeen percent of the hovering lift vector. This is more than ample for attaining elevator and rudder effectiveness. The elimination of the cyclic control (swash plate) necessitates utilization of the tilt feature incorporated with mast 12.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

We claim:

1. A rotor system comprising:
   a trunnion head mounted to a rotatable mast, said rotatable mast having a mast lengthwise axis;
   a control bar pivot having a pivot lengthwise axis, said control bar pivot supported by said trunnion head and pivotal about said pivot lengthwise axis, said pivot lengthwise axis being substantially at a right angle to said mast lengthwise axis;
   a control bar having a bar lengthwise axis, said control bar extending through said control bar pivot, said bar lengthwise axis being generally at a right angle to said pivot lengthwise axis; and
   a pair of opposing leaf hinges having a gap and pivotal about said bar lengthwise axis and having said trunnion head projecting, at least in part, through said gap, each of said leaf hinges having a hinge plate extending from said control bar and including a rotor blade mount hole extending through said hinge plate;
   wherein total lift generated by the rotor system is by rotational velocity of said mast without a collective pitch.

2. The rotor system according to claim 1, further including a rotor blade affixed to each of said hinge plates at said rotor blade mount hole and pivotal about a mount hole axis of said rotor blade mount hole.

3. The rotor system according to claim 2, wherein said rotor blades are pivotal through an arc of zero degrees to ninety degrees with respect to said bar lengthwise axis.

4. The rotor system according to claim 2, wherein said rotor blades are pivotal through an arc of fifteen to forty-five degrees with respect to said bar lengthwise axis.

5. The rotor system according to claim 2, wherein said rotor blades are pivotal through an arc of twenty five to thirty degrees with respect to said bar lengthwise axis.

6. The rotor system according to claim 2, wherein each said rotor blade includes a cambered airfoil cross-section.

7. The rotor system according to claim 2, wherein a pitch angle of attack of each said rotor blade is fixed and nonrotatable with respect to a plane of said leaf hinge when said rotor blade is affixed at a ninety degree angle with respect to said bar lengthwise axis.

8. The rotor system according to claim 7, wherein each of said rotor blades is mounted a fixed distance above said hinge plate.

9. The rotor system according to claim 8, wherein each of said rotor blades is mounted with a hydraulic apparatus for adjusting a distance each said rotor blade is above said hinge plate.

10. The rotor system according to claim 8, wherein each of said rotor blades is mounted with a ball screw apparatus for adjusting a distance each said rotor blade is above said hinge plate.

11. The rotor system according to claim 1, wherein said control bar terminates at two distal ends of the control bar and further includes a weight affixed at each said end of said control bar.

12. A helicopter having a helicopter rotor control system comprising:
    a trunnion head mounted to a rotatable helicopter mast, said rotatable helicopter mast having a mast lengthwise axis;
    a control bar pivot having a pivot lengthwise axis, said control bar pivot supported by said trunnion head and pivotal about said pivot lengthwise axis, said pivot lengthwise axis being substantially at a right angle to said mast lengthwise axis;
    a control bar having a bar lengthwise axis, said control bar extending through said control bar pivot, said bar lengthwise axis being generally at a right angle to said pivot lengthwise axis;
    a pair of opposing leaf hinges pivotal about said bar lengthwise axis, each of said leaf hinges having a hinge plate extending from said control bar;
    a rotor blade affixed to each of said hinge plates, a pitch angle of the rotor blades changing according to the rotational velocity of the rotor blades; and
    a rotor tilting mechanism for directional control.

13. The helicopter according to claim 12, wherein said rotor tilting mechanism for directional control comprises a swash plate including control rods running to a yoke encircling said trunnion head and said mast.

14. The helicopter according to claim 12, wherein said rotor tilting mechanism for directional control comprises a mast tilting mechanism.

15. The helicopter according to claim 12, wherein the rotor blade is affixed to each said hinge plate at a rotor blade mount hole extending through said hinge plate and is pivotal about a mount hole axis of said rotor blade mount hole.

16. The helicopter according to claim 15, wherein a pitch angle of attack of each said rotor blade is fixed and non-rotatable with respect to a plane of said leaf hinge when said rotor is affixed at a ninety degree angle with respect to said bar lengthwise axis.

17. The helicopter according to claim 16, wherein each said rotor blade is mounted a fixed distance above said hinge plate.

18. The helicopter according to claim 17, wherein each of said rotor blades is mounted with a hydraulic apparatus for adjusting a distance each said rotor blade is above said hinge plate.

19. The helicopter according to claim 17, wherein each of said rotor blades is mounted with a ball screw apparatus for adjusting a distance each said rotor blade is above said hinge plate.

20. The helicopter according to claim 12, wherein said control bar terminates at two distal ends of the control bar and further includes a weight affixed at each said end of said control bar.

21. A method of using a rotor system without a collective pitch system, the rotor system comprising a trunnion head mounted to a rotatable mast, a control bar, a pair of opposing leaf hinges pivotal about said control bar and centered about said trunnion head, a pair of rotor blades, and a rotor tilting mechanism for directional control, said trunnion head including a control bar pivot supported by said trunnion head and pivotal about an axis substantially at a right angle to said helicopter mast, said control bar extending through said control bar pivot at a right angle to said control bar pivot, each of said leaf hinges having a hinge plate extending from said control bar and defining a rotor blade mount hole extending through said hinge plate, each of said rotor blades affixed to each of said hinge plates at said rotor blade mount hole, the method comprising:

rotating the mast; and maintaining rotational velocity so that an increase in rotational velocity increases lift.

\* \* \* \* \*